United States Patent
Ishiyama (10) Patent No.: US 10,335,863 B2
(45) Date of Patent: Jul. 2, 2019

(54) MACHINE TOOL

(71) Applicant: FANUC CORPORATION, Yamanashi (JP)

(72) Inventor: Naoya Ishiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/924,667

(22) Filed: Mar. 19, 2018

(65) Prior Publication Data

US 2018/0281082 A1    Oct. 4, 2018

(30) Foreign Application Priority Data

Mar. 30, 2017    (JP) ................................. 2017-068212

(51) Int. Cl.
    B23B 31/26    (2006.01)
    B23Q 17/00    (2006.01)
    (Continued)

(52) U.S. Cl.
CPC .......... B23B 31/263 (2013.01); B23Q 17/003 (2013.01); *B23B 2231/50* (2013.01);
(Continued)

(58) Field of Classification Search
CPC ........ Y10T 409/309464; B23B 31/24–31/268; B23B 31/205; B23B 31/207
(Continued)

(56) References Cited

U.S. PATENT DOCUMENTS 4,745,673 A * 5/1988 Araki .................... B23B 31/263
                                                                 409/233
4,817,267 A * 4/1989 Hitomi ................. B23B 31/265
                                                                 409/233

(Continued)

FOREIGN PATENT DOCUMENTS

JP        59-059330 A   *  4/1984
JP       S60-009629 A     1/1985
(Continued)

OTHER PUBLICATIONS

Office Action issued in JP 2017-068212; mailed by the Japanese Patent Office dated Oct. 16, 2018.
(Continued)

*Primary Examiner* — Erica E Cadugan
(74) *Attorney, Agent, or Firm* — Studebaker & Brackett PC (57) ABSTRACT

A machine tool includes: a column; a spindle head supported by the column; a spindle in the spindle head; a draw bar moved upward to clamp a tool to the lower end portion of the spindle and moved downward to release the tool therefrom; a biasing portion biasing the draw bar upward; a cam mechanism including a cam in the column and an arm whose one end slides on a cam surface such that the other end pushes down the draw bar; a measurement portion measuring the position of the draw bar; a storage portion storing a position relationship between the spindle head and the draw bar when the cam mechanism is normal; and an abnormality determination portion determining an abnormality in the cam mechanism based on the position of the draw bar measured with the measurement portion and the relationship stored in the storage portion.

1 Claim, 5 Drawing Sheets

(51) Int. Cl.
  *B23C 5/26* (2006.01)
  *B23Q 3/157* (2006.01)
  *B23Q 3/155* (2006.01)
(52) U.S. Cl.
  CPC .... *B23B 2260/102* (2013.01); *B23Q 3/15534* (2016.11); *Y10T 409/309464* (2015.01); *Y10T 483/1795* (2015.01)
(58) Field of Classification Search
  USPC ........................................................ 409/233
  See application file for complete search history.

(56) References Cited

U.S. PATENT DOCUMENTS

| | | | | |
|---|---|---|---|---|
| 4,873,756 A | * | 10/1989 | Yamane | B23Q 3/15706 483/56 |
| 5,070,592 A | * | 12/1991 | Sugata | B23B 31/263 409/233 |
| 7,217,230 B2 | * | 5/2007 | Hyun | B23B 31/261 409/233 |
| 7,393,311 B1 | * | 7/2008 | Giovanelli | B23Q 17/003 409/233 |
| 2003/0071526 A1 | | 4/2003 | Faigle | |
| 2014/0349824 A1 | * | 11/2014 | Chen | B23Q 3/1552 483/30 |
| 2018/0036854 A1 | * | 2/2018 | Takano | B23Q 17/003 |

FOREIGN PATENT DOCUMENTS

| | | | |
|---|---|---|---|
| JP | 02-065905 A | * | 3/1990 |
| JP | 03-086408 A | * | 4/1991 |
| JP | H3-277451 A | | 12/1991 |
| JP | 2001-322013 A | | 11/2001 |
| JP | 2005-028534 A | * | 2/2005 |
| JP | 2005-319540 A | * | 11/2005 |
| JP | 2006-106849 A | * | 4/2006 |
| JP | 2009-160690 A | | 7/2009 |
| JP | 2009-178795 A | | 8/2009 |
| JP | 2018-205891 A | * | 12/2018 |
| WO | 2016/139726 A1 | | 9/2016 |

OTHER PUBLICATIONS

Office Action issued in JP 2017-068212; mailed by the Japanese Patent Office dated Jan. 22, 2019.

An Office Action; "Notification of Reasons for Refusal," mailed by the Japanese Patent Office dated Oct. 16, 2018, which corresponds to Japanese Patent Application No. 2017-068212 and is related to U.S. Appl. No. 15/924,667.

\* cited by examiner

MACHINE TOOL

This application is based on and claims the benefit of priority from Japanese Patent Application No. 2017-068212, filed on 30 Mar. 2017, the content of which is incorporated herein by reference.

BACKGROUND OF THE INVENTION

Field of the Invention

The present invention relates to machine tools.

Related Art

Conventionally, a machine tool is known in which a tool arranged in a predetermined position is clamped, and in which as necessary, the clamped tool is released and replaced with another tool. Specifically, the machine tool includes a draw bar which is arranged within a spindle and which is moved downward to clamp the tool, an arm which pushes down the draw bar and a cam mechanism which pushes down the arm with a cam (see, for example, Patent Document 1). The draw bar is biased upward by a spring within the spindle, and when the cam is used to push down the arm, the spring is extended so as to clamp or unclamp the tool.

When a failure occurs in a mechanism in which the draw bar clamps the tool, the tool may fall. Hence, a technology is proposed which monitors a spring force within a draw bar for clamping a tool so as to detect the deterioration of the spring (see, for example, Patent Documents 2 and 3).

Patent Document 1: Japanese Unexamined Patent Application, Publication No. S60-9629

Patent Document 2: Japanese Unexamined Patent Application, Publication No. 2009-160690

Patent Document 3: Japanese Unexamined Patent Application, Publication No. 2001-322013

SUMMARY OF THE INVENTION

However, the component which is deteriorated is not limited to the spring therewithin. When the spring is extended so as to push down the draw bar, a load is applied to the constituent components of a cam mechanism, and thus the constituent components of the cam mechanism may be damaged. When the cam mechanism is damaged, it is likely that clamping is not normally released such that the tool falls, and thus it is necessary to prevent the damage of the cam mechanism described above.

An object of the present invention is to provide a machine tool which can detect an abnormality in a cam mechanism so as to prevent the damage thereof.

(1) A machine tool (for example, a machine tool 1 which will be described later) according to the present invention includes: a column (for example, a column 2 which will be described later) which includes a feed axis (for example, a feed axis 21 which will be described later) that is extended in an up/down direction; a spindle head (for example, a spindle head 3 which will be described later) which is movably supported by the column in the up/down direction; a spindle (for example, a spindle 4 which will be described later) which is provided in the spindle head and which is extended in the up/down direction; a draw bar (for example, a draw bar 5 which will be described later) which is movably provided within the spindle in the up/down direction, which is relatively moved upward with respect to the spindle so as to clamp, in cooperation with the spindle, a tool (for example, a tool 101 which will be described later) to a lower end portion of the spindle and which is relatively moved downward with respect to the spindle so as to release the tool from the lower end portion; a biasing portion (for example, a biasing portion 6 which will be described later) which biases the draw bar upward; and a cam mechanism which includes a cam (for example, a cam 70 which will be described later) provided in the column and an arm (for example, an arm 7 which will be described later) which is turnably supported by the spindle head and whose one end slides on a cam surface of the cam such that the other end pushes down the draw bar, where the machine tool further includes: a measurement portion (for example, a measurement portion 91 which will be described later) which measures, with a distance sensor (a distance sensor 8 which will be described later) provided in the spindle head, a position of the draw bar in the up/down direction; a storage portion (for example, a storage portion 92 which will be described later) which stores a relationship between a position of the spindle head and a position of the draw bar when the draw bar is normal; and an abnormality determination portion (for example, an abnormality determination portion 93 which will be described later) which determines an abnormality in the cam mechanism based on the position of the draw bar measured with the measurement portion and the relationship stored in the storage portion.

(2) Preferably, in the machine tool according to (1), the cam includes the cam surface in which an inclination surface (for example, an inclination surface 701 which will be described later) that is inclined to a tip side of the spindle head as the inclination surface is extended upward and a flat surface (for example, a flat surface 702 which will be described later) that is extended in the up/down direction are formed sequentially from below and continuously, and the measurement portion measures, after the one end of the arm reaches the flat surface of the cam surface, the position of the draw bar in the up/down direction.

According to the present invention, it is possible to provide a machine tool which can detect an abnormality in a cam mechanism so as to prevent the damage thereof.

DETAILED DESCRIPTION OF THE INVENTION

Figure 1:
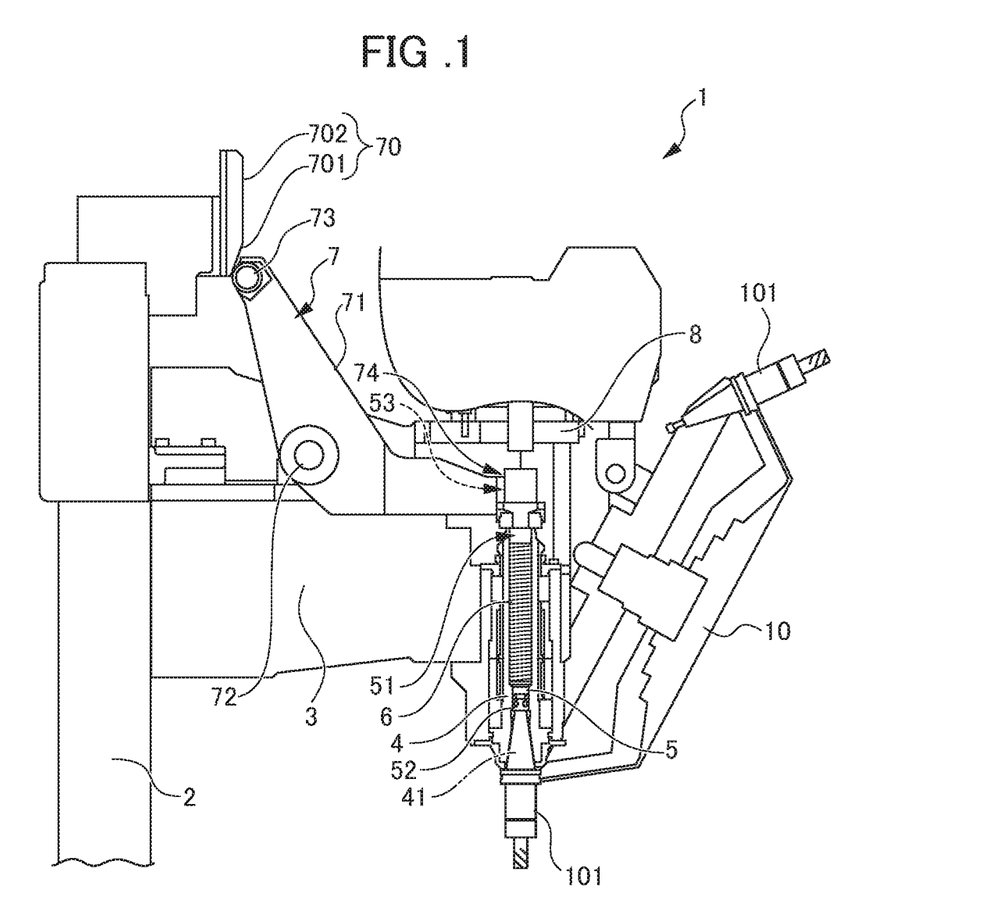
FIG. 1 is a partial side view of a machine tool in the present embodiment.

An embodiment of the present invention will be described in detail below with reference to drawings. FIG. 1 is a partial side view of a machine tool 1 in the present embodiment. The machine tool 1 is specifically a machining center, and includes a turret 10, a column 2, a spindle head 3, a spindle 4, a draw bar 5, a biasing portion 6, a cam 70 and an arm 7 which form a cam mechanism, a distance sensor 8 and a control portion 9 (see FIG. 4).

The turret 10 is a disk-shaped portion which holds a plurality of tools 101, and is rotatably attached to the machine tool 1 such that the tool can be replaced with a desired tool 101 according to an operation.

The column 2 is a columnar portion which is extended substantially in a vertical direction with respect to a work table (unillustrated). The column 2 includes a feed axis 21 which is arranged therewithin. The feed axis 21 is extended upward and downward within the column 2, and is driven by a servomotor 22 (see FIG. 4) which is provided at the upper end of the column 2.

The spindle head 3 is supported by the column 2 so as to be able to be moved in an up/down direction, and the base end side of the spindle head 3 is connected to the feed axis 21 of the column 2. The spindle head 3 is extended from the side of the column 2 toward the side of the turret 10 in a direction substantially perpendicular to the direction in which the column 2 is extended, and supports the spindle 4, the arm 7 and the like which will be described later.

The spindle 4 is provided on the tip side of the spindle head 3 so as to be extended in the up/down direction. The interior of the spindle 4 is hollow, and the spindle 4 is rotatably provided. The spindle 4 includes a tool storage portion 41 in which, as a substantially cylindrical hollow portion is extended to a lower end portion, its diameter is increased.

Figure 2:
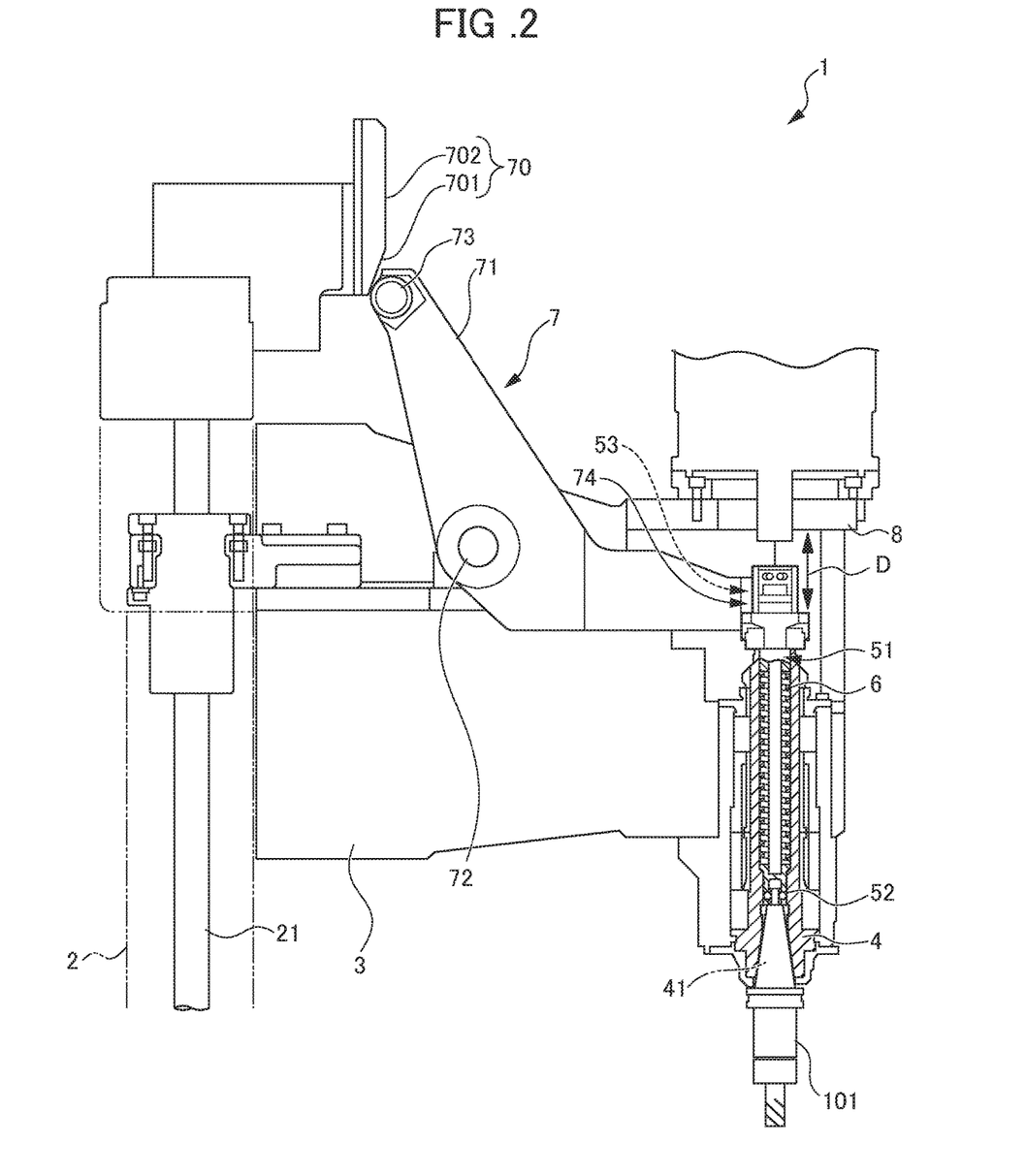
FIG. 2 is a partial cross-sectional view of the machine tool in the present embodiment and shows a state where a draw bar is located upward.
Figure 3:
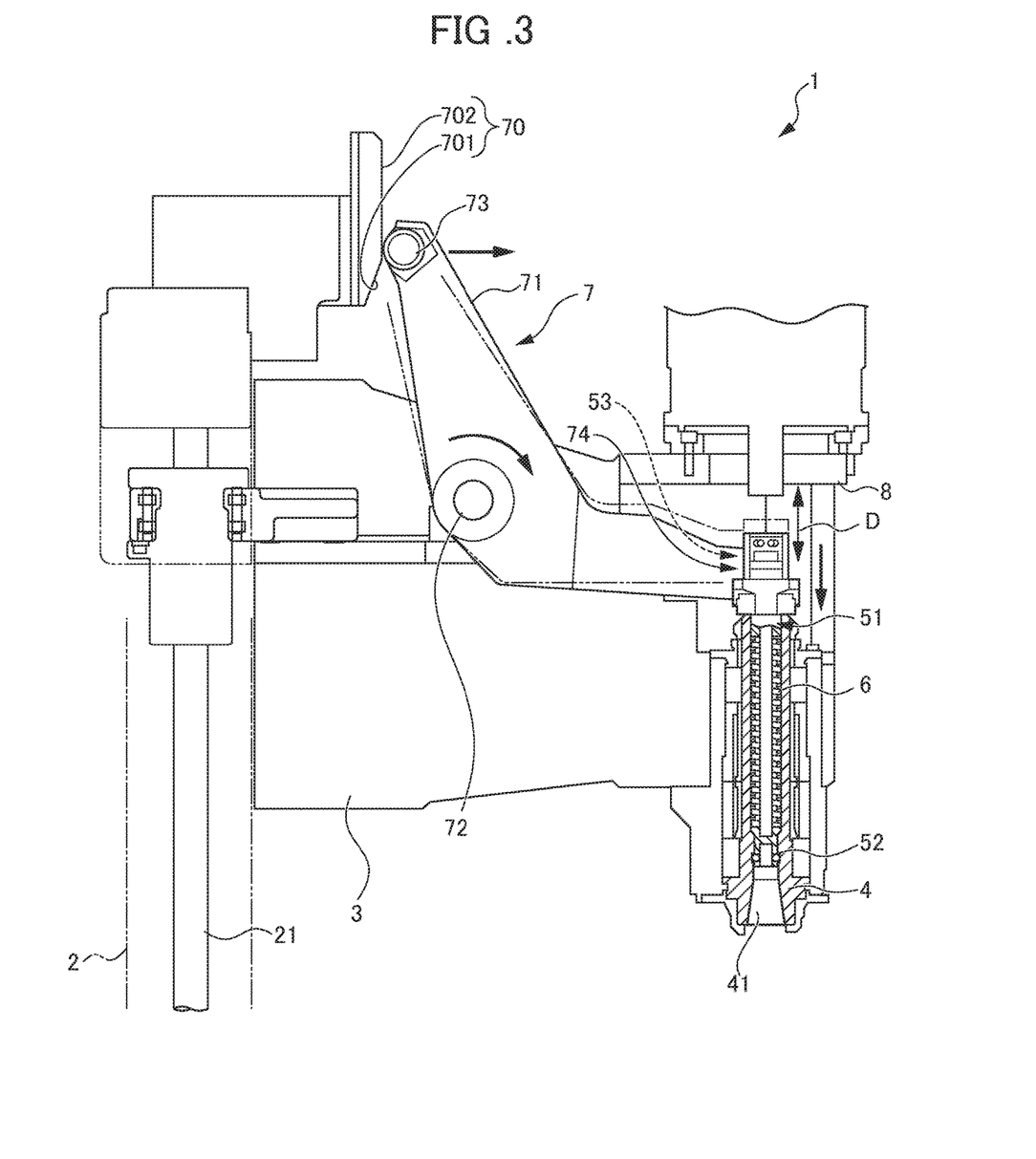
FIG. 3 is a partial cross-sectional view of the machine tool in the present embodiment and shows a state where the draw bar is located downward.

FIG. 2 is a partial cross-sectional view of FIG. 1. In FIG. 2, the turret 10 is omitted. FIG. 3 is a partial cross-sectional view showing a state where the spindle head 3 is further raised from the state of FIGS. 1 and 2. As shown in FIGS. 2 and 3, the draw bar 5 is arranged within the hollow spindle 4, and is provided within the spindle 4 so as to be able to be moved upward and downward. The draw bar 5 includes a draw bar main body 51, a ball 52 and a clamp cam 53.

The draw bar main body 51 is a substantially cylindrical member.

The ball 52 is arranged on the tip side of the draw bar main body 51, and when the draw bar main body 51 is moved upward with respect to the spindle 4, the ball 52 acts on the inner surface of the tool storage portion 41 so as to engage with a groove portion (unillustrated) provided along the outer circumference of the tip of the tool. When the draw bar main body 51 is moved downward with respect to the spindle 4, the ball 52 is separated from the outer circumference of the groove portion so as to release the tool 101.

The clamp cam 53 is arranged at the upper end of the draw bar main body 51, and pushes out the draw bar 5 downward in order to unclamp the clamped tool 101.

The biasing portion 6 is arranged between the outer circumferential surface of the draw bar main body 51 and the inner circumferential surface of the spindle 4, and biases the draw bar 5 upward with respect to the spindle 4. The biasing portion 6 is a coil spring.

The cam 70 is provided on the surface of the column 2 on the side of the spindle 4 in a position in which the cam 70 is protruded from the column 2 toward the spindle 4. The cam 70 is formed with a plate-shaped member which is extended substantially in a vertical direction. As shown in FIG. 1, the cam 70 includes, sequentially from below in side cross-sectional view, an inclination surface 701 which is inclined to the tip side of the spindle head 3 as the inclination surface 701 is extended upward and a flat surface 702 which is extended from the upper end of the inclination surface 701 straight in the up/down direction. The inclination surface 701 and the flat surface 702 are continuous with each other so as to form a cam surface of the cam 70.

The arm 7 is turnably supported by the spindle head 3, one end slides on the cam surface of the cam 70 and the other end is connected to the draw bar 5. The arm 7 includes an arm main body 71, a turning support point 72, a cam follower 73 and a push-out portion 74.

The arm main body 71 is arranged between the cam 70 and the tip side of the spindle head 3. The turning support point 72 is provided in the arm main body 71. A horizontal axis which is provided in the spindle head 3 is inserted through the interior of the turning support point 72, and thus the turning support point 72 supports the arm main body 71 such that the arm main body 71 can be turned to the side of the column 2 and to the side of the draw bar 5.

The cam follower 73 is a cylindrical member which is provided at one end of the arm main body 71. The axis of the cam follower 73 is extended in the same direction as the horizontal axis of the turning support point 72. The surface of the cylindrical member which is rotated around the axis of the cam follower 73 slides on the cam 70.

The push-out portion 74 is extended from the turning support point 72 to the other end of the arm main body 71 and is connected to the clamp cam 53 at the upper end of the draw bar 5.

The distance sensor 8 is a non-contact proximity sensor which is provided on the tip side of the spindle head 3 and which is arranged in the vicinity of the upper end of the draw bar 5. The distance sensor 8 measures a distance D between the tip of the spindle head 3 and the upper end of the draw bar 5.

Figure 4:
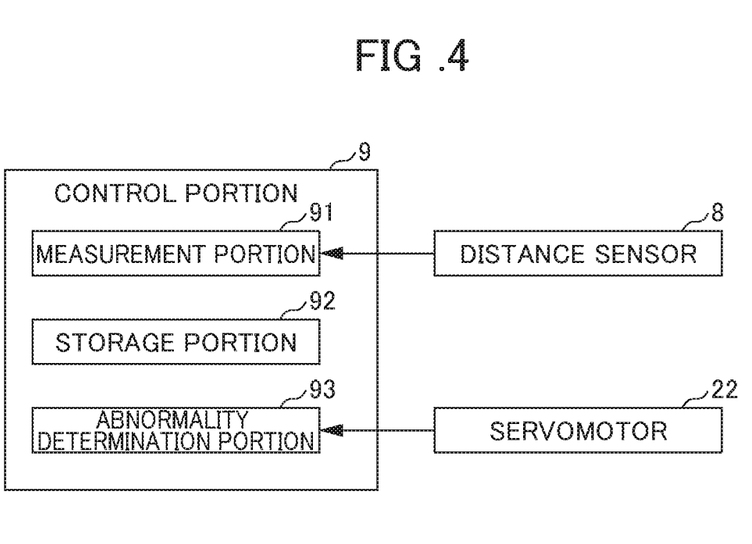
FIG. 4 is a functional block diagram of a control portion which controls the machine tool in the present embodiment.

FIG. 4 is a functional block diagram of a control portion 9 which controls the machine tool 1.

As shown in FIG. 4, the control portion 9 includes a measurement portion 91, a storage portion 92 and an abnormality determination portion 93. The control portion 9 may be provided in the machine tool 1 or may be provided in an unillustrated numerical control device which controls the operation of the machine tool 1.

The measurement portion 91 acquires information on the distance D measured by the distance sensor 8. The measurement portion 91 uses the distance D so as to measure the position of the draw bar 5 in the up/down direction when the draw bar 5 does not clamp the tool 101.

The storage portion 92 previously stores, as a normal position, a relationship between the position of the spindle head 3 and the position of the draw bar 5 when, in a state where there is no abnormality in the cam mechanism and where the draw bar 5 is operated normally, the draw bar 5 does not clamp the tool 101. The storage portion 92 also stores a relationship between the position of the spindle head 3 and the position of the draw bar 5 when the draw bar 5 clamps the tool 101.

The abnormality determination portion 93 references the position of the draw bar 5 measured by the measurement portion 91, and acquires the position of the spindle head 3 from the servomotor 22. Then, the abnormality determination portion 93 compares the position of the draw bar 5 when an abnormality is determined and the position of the spindle head 3 acquired from the servomotor 22 with the normal positions of the spindle head 3 and the draw bar 5 previously stored in the storage portion 92, and thereby determines whether or not the position of draw bar 5 is the normal position. When the position of the draw bar 5 is not the normal position, the abnormality determination portion 93 determines that an abnormality is present in any part of the cam mechanism including the cam 70 and the arm 7.

When the abnormality determination portion 93 determines that the position of the draw bar 5 is not the normal position, an unillustrated notification means or the like is used so as to provide a notification by lighting, alarm sound or the like.

Figure 5:
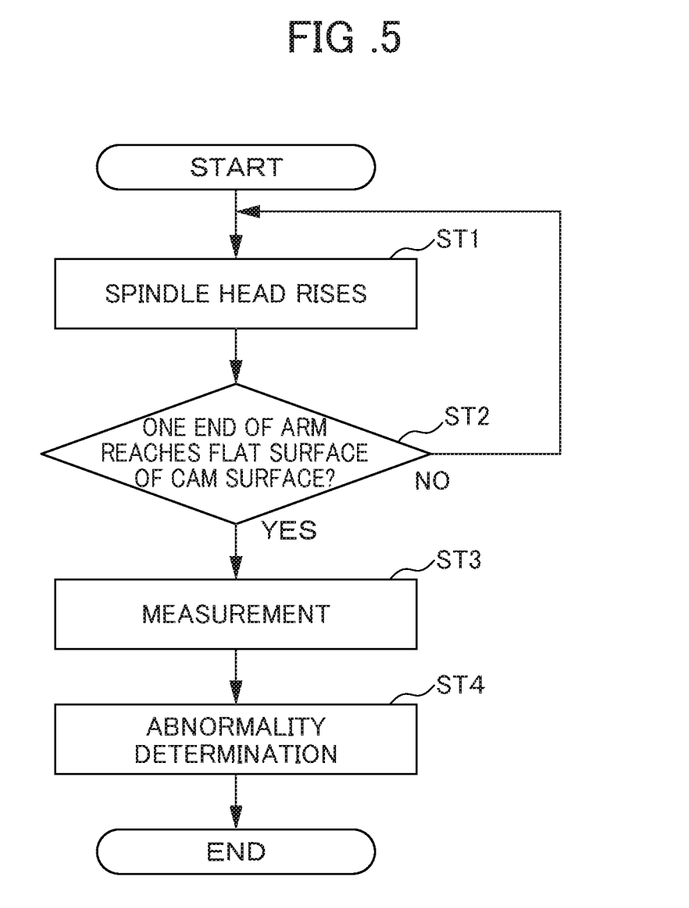
FIG. 5 is a flowchart showing abnormality determination processing in the present embodiment.

FIG. 5 is a flowchart showing abnormality determination processing in the present embodiment. The operation of the machine tool 1 will be described with reference to FIGS. 1 to 5. FIG. 1 shows a state where the tool 101 is clamped by the draw bar 5 within the spindle 4. A plurality of tools 101 are held by the turret 10.

In this state, the biasing portion 6 biases the draw bar 5 upward. The draw bar 5 is relatively moved upward with respect to the spindle 4, and thus the ball 52 of the draw bar 5 is fitted to the groove portion in the outer circumference of the tool 101, with the result that the tool 101 is clamped, in cooperation with the spindle 4, within the tool storage portion 41 on the side of the lower end portion of the spindle 4.

The distance sensor 8 continuously measures and monitors the distance D between the draw bar 5 and the spindle head 3 so as to determine whether or not the draw bar 5 clamps the tool 101.

The position of the draw bar 5 differs depending on whether the draw bar 5 clamps the tool 101 or the draw bar 5 does not clamp the tool 101. When the draw bar 5 clamps the tool 101, the draw bar 5 is located lower than the draw bar 5 which does not clamp the tool 101. The storage portion 92 of the control portion 9 in the machine tool 1 previously stores, as the normal position, an appropriate threshold value T1 for the distance between the draw bar 5 and the spindle head 3 when the draw bar 5 does not clamp the tool 101. The storage portion 92 previously stores an appropriate threshold value T2 for the distance between the draw bar 5 and the spindle head 3 when the draw bar 5 clamps the tool 101. The threshold value T1 is a range which is lower than the threshold value T2. The reason why the distance D serves as the threshold values is that as described above, a certain range is needed because the spindle head 3 may be temporarily raised after being lowered.

When the value acquired by the measurement portion 91 from the distance sensor 8 falls within the threshold value T1, the abnormality determination portion 93 determines that the draw bar 5 is in the normal position and that the draw bar 5 does not clamp the tool 101. When it is determined that the draw bar 5 does not clamp the tool 101, the spindle 4 is not rotated.

When the value acquired by the measurement portion 91 from the distance sensor 8 falls outside the threshold value T1, and falls within the range of the threshold value T2 (that is, the draw bar 5 is separated lower than a position which is separated the distance D from the spindle head 3), the abnormality determination portion 93 determines that the draw bar 5 is normally operated and that the draw bar 5 clamps the tool 101.

When a tool replacement command is received from the control portion 9 by an operation of a user, the spindle head 3 is raised from the position of FIG. 1 (see ST1 in FIG. 5). As the spindle head 3 is raised, the turret 10 grips the tool 101 clamped by the draw bar 5 while being swung.

As shown in FIG. 3, when the spindle head 3 is raised from the state of FIG. 2, the cam follower 73 provided at one end of the arm 7 makes contact with the cam 70, and thus the inclination surface 701 is made to slide upward. Since the inclination surface 701 is inclined as it is extended upward from the side of the column 2 to the tip side of the spindle head 3, the cam follower 73 is moved to the tip side (the right side of FIG. 3) of the spindle head 3.

The control portion 9 senses whether the cam follower 73 reaches the flat surface 702 from the upper end of the inclination surface 701, and after the cam follower 73 reaches the flat surface 702 (see ST2 in FIG. 5), the control portion 9 makes the measurement portion 91 use the distance sensor 8 to acquire the position of the draw bar 5 in the up/down direction and makes the measurement portion 91 measure the position of the draw bar 5. The control portion 9 makes the abnormality determination portion 93 acquire the position of the spindle head 3 from the servomotor 22 (see ST3 in FIG. 5).

Then, the abnormality determination portion 93 determines whether or not the distance D between the position of the draw bar 5 measured with the measurement portion 91 and the position of the spindle head 3 acquired from the servomotor 22 is lower than the range of the threshold value T1. As described previously, in a case where the draw bar 5 falls within the appropriate threshold value T1 when the draw bar 5 does not clamp the tool 101, the abnormality determination portion 93 determines that the draw bar 5 is in the normal position.

When the distance D between the draw bar 5 and the spindle head 3 is a short distance so as to be lower than the range of the threshold value T1, the abnormality determination portion 93 determines that an abnormality is present in the cam mechanism. In other words, when the draw bar 5 is lowered only by a distance equal to or less than the threshold value T1, the abnormality determination portion 93 detects a failure in any part of the mechanism for pushing down the draw bar 5 so as to determine that an abnormality is present (see ST4 in FIG. 4).

If a failure occurs in the cam mechanism, that is, if the rotation angle of the turning support point 72 in the arm 7 is decreased such as by the wear and the displacement of the cam surface, the displacement of the arm 7, the deformation of a column and the wear of an outer ring in the cam follower 73, the displacement of the center axis of the column, the displacement of the axis of the turning support point 72 or the displacement of clamp cam 53 in the draw bar 5 connected to the other end of the arm 7, the other end of the arm 7 is prevented from being lowered, with the result that it is difficult to sufficiently push down the draw bar 5. When the draw bar 5 is not sufficiently lowered, the ball 52 is not separated, and thus the clamping of the tool 101 is not released. When the tool 101 attempts to be replaced in a state where the clamping of the tool 101 is not normally released, the tool 101 may fall. Hence, when the positions of the tip of the spindle head 3 and the upper end of the draw bar 5 are higher than the normal position (when the distance D falls within a threshold value lower than the threshold value T1 of the normal position), it is found that the lowering of the arm 7 is not sufficient and that thus a failure occurs in any part of the cam mechanism.

When the abnormality determination portion 93 determines that an abnormality is present, the abnormality is notified by the unillustrated notification means, and thus the user can perform an inspection, a repair or the like.

When an abnormality is not present in the cam mechanism, as the cam follower 73 slides upward on the inclination surface 701, the arm 7 is rotated about the turning support point 72 serving as the support point, the push-out portion 74 is moved downward. By the movement of the push-out portion 74, the upper end of the draw bar 5 connected to the push-out portion 74 is moved along the clamp cam 53, and thus the other end of the arm 7 pushes down the draw bar 5. The draw bar 5 is moved downward against the biasing force of the biasing portion 6.

When the draw bar 5 is moved downward, the ball 52 engaging with the groove portion of the tool 101 is released outward in a radial direction, and thus the gripping of the tool 101 is released. As described above, the draw bar 5 is relatively moved downward with respect to the spindle 4, and thus the tool 101 is released from the lower end portion of the spindle 4. Then, the tool 101 gripped by the turret 10 is removed. Thereafter, the spindle 4 is temporarily raised and the turret 10 is rotated, and a tool 101 with which the tool 101 needs to be replaced is allocated instead of the removed tool 101, with the result that the tool 101 is clamped to the draw bar 5.

According to the present embodiment, the following effects are produced.

The machine tool 1 according to the present embodiment includes: the column 2 which includes the feed axis 21 that is extended in an up/down direction; the spindle head 3 which is movably supported by the column 2 in the up/down direction; the spindle 4 which is provided in the spindle head 3 and which is extended in the up/down direction; the draw bar 5 which is movably provided within the spindle 4 in the up/down direction, which is relatively moved upward with respect to the spindle 4 so as to clamp, in cooperation with the spindle 4, the tool to the lower end portion of the spindle 4 and which is relatively moved downward with respect to the spindle 4 so as to release the tool 101 from the lower end portion; the biasing portion 6 which biases the draw bar 5 upward; and the cam mechanism which includes the cam 70 provided in the column 2 and the arm 7 which is turnably supported by the spindle head 3 and whose one end slides on the cam surface of the cam 70 such that the other end pushes down the draw bar 5. The machine tool 1 further includes: the measurement portion 91 which measures, with the distance sensor 8 provided in the spindle head 3, the position of the draw bar 5 in the up/down direction; the storage portion 92 which stores a relationship between the position of the spindle head 3 and the position of the draw bar 5 when the draw bar 5 is normal; and the abnormality determination portion 83 which determines an abnormality in the cam mechanism based on the position of the draw bar 5 measured with the measurement portion 91 and the relationship stored in the storage portion 92.

In the present embodiment, the distance sensor 8 is used to measure the position of the draw bar 5, and thus it is possible to detect the deterioration of the cam mechanism based on the relationship between the position of the spindle head 3 and the position of the draw bar 5 which are previously stored when the cam mechanism is normal. Hence, by finding an abnormality in the cam mechanism in an early stage and coping with the abnormality, it is possible to prevent the tool from falling and the damage of the cam mechanism.

In the present embodiment, the distance sensor which is used for detecting whether or not the draw bar 5 clamps the tool 101 can be used so as to find an abnormality in the cam mechanism, and thus it is possible to find an abnormality in the cam mechanism without the addition of a new mechanism.

In the present embodiment, the cam 70 includes the cam surface in which the inclination surface 701 that is inclined to the tip side of the spindle head 3 as the inclination surface is extended upward and the flat surface 702 that is extended in the up/down direction are formed sequentially from below and continuously, and the measurement portion 91 measures, after the one end of the arm 7 reaches the flat surface 702 of the cam surface, the position of the draw bar 5 in the up/down direction. In this way, it is possible to measure the position of the draw bar 5 in a state where the draw bar 5 is lowered and thereby determine the state of the cam mechanism depending on whether the draw bar 5 is lowered only a short distance as compared with a normal range without being sufficiently lowered or the draw bar 5 is normally lowered.

The present invention is not limited to the embodiment described above. Variations and modifications are also included in the present invention as long as the object of the present invention can be achieved.

For example, as a variation of the embodiment described above, in addition to the distance sensor 8, a temperature sensor can be attached to the machine tool. Specifically, the temperature sensor is attached to the cam surface of the cam 70, and thus an increase in the temperature is detected by the frictional heat of the cam.

The measurement portion 91 acquires the temperature of the cam surface from the temperature sensor.

The storage portion 92 previously stores the normal temperature range of the frictional heat when the cam follower 73 slides on the surface of the cam 70 in the state of a normal use as individual threshold values.

The abnormality determination portion 93 compares a value which is obtained by newly measuring the frictional heat with the measurement portion 91 when the cam follower 73 slides on the surface of the cam 70 with the previously stored normal temperature range, and thereby determines whether or not the temperature of the surface of the cam 70 is normal. When the frictional heat exceeds the normal temperature range, it is determined that the state of the cam 70 or the cam follower 73 is abnormal.

By attaching the temperature sensor, as compared with the case where an abnormality is detected only by the position of the draw bar 5, it is possible to reliably detect an abnormality in the cam mechanism.

EXPLANATION OF REFERENCE NUMERALS

1 machine tool
2 column
3 spindle head
4 spindle
5 draw bar
6 biasing portion
7 arm
8 distance sensor
70 cam
91 measurement portion
92 storage portion
93 abnormality determination portion

What is claimed is:

1. A machine tool comprising:
  a column which includes a feed drive for causing movement along an axis that is extended in an up/down direction;
  a spindle head which is movably supported by the column for movement in the up/down direction;
  a spindle which is provided in the spindle head and which is extended in the up/down direction;
  a draw bar which is movably provided within the spindle for movement in the up/down direction, which drawbar is relatively moved upward with respect to the spindle so as to clamp, in cooperation with the spindle, a tool to a lower end portion of the spindle and which drawbar is relatively moved downward with respect to the spindle so as to release the tool from the lower end portion;

a biasing portion which biases the draw bar upward; and a cam mechanism provided to the column, which cam mechanism includes a cam and includes an arm which is turnably supported by the spindle head, and one end of the arm slides on a cam surface of the cam such that an other end of the arm pushes down the draw bar, wherein the machine tool further includes:

a measurement portion which measures, with a distance sensor provided in the spindle head, a position of the draw bar in the up/down direction;

a storage portion which stores a relationship between a position of the spindle head and a position of the draw bar when the draw bar is normal; and an abnormality determination portion which determines an abnormality in the cam mechanism based on the position of the draw bar measured with the measurement portion and based on the relationship stored in the storage portion, wherein the cam surface includes an inclination surface that is inclined towards a tip side of the spindle head as the inclination surface is extended upward, and the cam surface further includes a flat surface that is extended in the up/down direction and that is formed sequentially above and continuously with the inclination surface, and wherein a controlling portion is configured so that the measurement portion measures, after the one end of the arm reaches the flat surface of the cam surface, the position of the draw bar in the up/down direction.

* * * * *